United States Patent Office 3,419,326
Patented Dec. 31, 1968

3,419,326
MOTION PICTURE CAMERA PROVIDED WITH EXPOSURE CONTROL DEVICE AND FILM SPEED SELECTOR
Gerhard Börner, Musberg Kreis Boblingen, Germany, assignor to Zeiss Ikon Aktiengesellschaft, Stuttgart, Germany, a corporation of Germany
Filed Oct. 21, 1965, Ser. No. 499,216
Claims priority, application Germany, Nov. 14, 1964, Z 11,175
10 Claims. (Cl. 352—141)

ABSTRACT OF THE DISCLOSURE

A motion picture camera provided with exposure control means comprising a photoelectrically controlled motor driven adjustable diaphragm with a speed reduction gearing between the motor and a diaphragm adjusting ring. The camera is also provided with a film speed or picture frequency adjusting member which is connected with said speed reduction member to effect an adjustment of said diaphragm adjusting ring independently of said motor to a position in which the diaphragm aperture corresponds to the selected film speed.

---

The invention relates to a motion picture camera provided with an exposure control device and a film speed selector that may be adjusted during the operation of the camera. The exposure control device of the motion picture camera includes a photoelectrically controlled diaphragm adjusting motor which by means of a reducing gearing adjusts the objective diaphragm, preferably an iris diaphragm.

Cameras are known in which the diaphragm aperture is adjusted in dependence of the selected film speed or picture frame frequency and when the latter is changed, the diaphragm aperture is likewise changed. In this way a difference in exposure time which is produced when the speed of the film movement is changed, is compensated for by a corresponding change of the aperture of the diaphragm.

In cameras provided with automatic exposure control means the adjustment of the diaphragm to different exposure times is accomplished by an adaptation of the control circuit of the exposure control at the same time the film speed is changed. The automatic exposure control then adjusts the diaphragm automatically in accordance with the different exposure time. This automatic correction of the diaphragm is, however, for mechanical reasons quite slow and misexposures subsequent to a change of speed cannot be avoided.

This condition is partially remedial by a camera in which the film speed selector controls a coupling member which, when the film speed is changed, is coupled with the movable part of the measuring instrument and rotates this member to the extent that it adjusts the objective diaphragm controlled by this member to the different light conditions. This means that the adjustment of the diaphragm takes place simultaneously with the change of the film speed so that a subsequent misexposure is prevented. However, the disadvantage here is that the movable member of the measuring instrument is locked as long as the newly adjusted speed, in most cases a slow motion speed, is retained. This means that after a change of the film speed no exposure control is available for any exposure correction which might become necessary due to outside circumstances. Such a camera is limited in its range of utility. It permits only a change of speed for a short time when making an exposure in the same direction. Any minor deviation from a dark to a lighter object, or vice versa, will already result in misexposures. Furthermore, a camera of this type is not capable of being adjusted manually if desired.

In cameras equipped, for instance, with an iris diaphragm and with a photoelectrically controlled diaphragm adjusting motor, the automatic correction of the diaphragm aperture, after changing the film speed, is even slower than in diaphragm leaves operated by a measuring instrument. The possible remedy described before is, however, even if its disadvantages were tolerated, not suitable for cameras equipped with a diaphragm adjusting motor and an iris diaphragm.

Here is where the invention comes in. The object of the invention is to create a device by which the aperture of a motor controlled diaphragm, preferably an iris diaphragm, is—when a different film speed is selected—immediately adjusted to the different light conditions. The diaphragm is to be adjustable by the exposure control means as well as by hand, regardless of the position of the film speed selector.

According to the invention, the films speed selector in addition to its connection to structural elements of the control circuit of the exposure control device is positively connected to the camera objective diaphragm in such a manner that when changing the film speed the energy of the speed selector rather than the automatic control device effects the adjustment of the diaphragm aperture to the new light conditions.

In a preferred embodiment of the invention, a reducing gearing is provided of which one member is disposed between the diaphragm adjusting motor and the objective diaphragm and has a degree of freedom of more than 1. This member is movably mounted in the camera casing and connected to the speed selector. This gearing utilizes to a large extent structural elements already present on the camera objective and can therefore readily be installed without any difficulties.

Another embodiment of the gearing according to the invention is also very simple in its construction and consists of a speed selector which is provided with a resilient operating member projecting through an opening in the camera casing and is adapted to engage a diaphragm adjusting ring, preferably the ring used for manual adjustment, and by pressure against the action of its resiliency is caused to become operatively connected with said diaphragm adjusting. This operating member uses an opening or slot in the camera casing as a guide which provides terminal stops with abutments for the coupling disposed adjacent the diaphragm ring and a locking or ratchet device for this coupling between the abutments. In this manner, using the described operating member, the change of film speed and the readjustment of the diaphragm is carried out simultaneously. Thereby the correction of the diaphragm aperture is effected against friction means interposed between the diaphragm adjusting ring and the control drive of the automatic exposure control device, much in the same way as with the manual operation of the diaphragm upon turning off the exposure control device. It is therefore expedient to use the ring for the manual adjustment of the diaphragm also for the readjustment of the diaphragm upon changing the film speed.

The invention will now be explained in more detail with reference to the accompanying drawings which disclose further features of the invention. Details not absolutely necessary for an understanding of the invention have been omitted for the sake of clarity. The illustrated embodiments relate particularly to the drive connection between the speed selector and the diaphragm adjusting ring, while the known means for influencing the control circuit of the exposure control device by the film speed selector are omitted.

Figure 1:
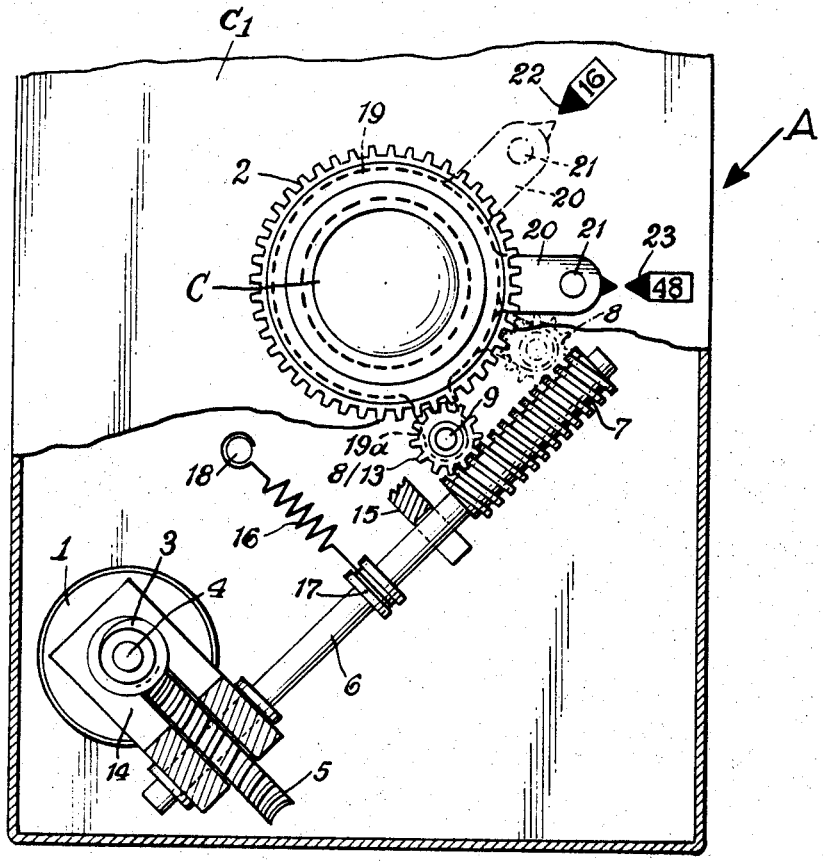
FIG. 1 is a partial front elevation view of a motion picture camera ilustrating diagrammatically the film speed selector device and its connection with the diaphragm adjusting means.
Figure 2:
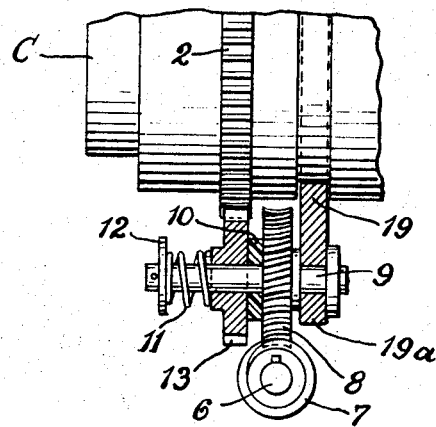
FIG. 2 illustrates in a sectional view details of the drive connection when looking into the direction of the arrow A in FIG. 1.

Referring to FIG. 1, a diaphragm adjusting ring 2 arranged concentrically about the optical axis of the camera objective C is adapted to be adjusted by a diaphragm adjusting motor 1. For this purpose serves a gearing comprising a worm 3 mounted on the motor shaft 4 of the diaphragm adjusting motor 1 and meshing with a worm wheel 5 on a shaft 6 which latter has also a worm 7 mounted thereon. A worm wheel 8 mounted on a bearing pin 9 is in engagement with one end of the worm 7 of considerable axial length, and, as illustrated in FIG. 2, a pinion 13 on the same bearing pin 9 is frictionally connected to the worm wheel 8 by means of a disc 10, a spring 11 and a locking ring 12. In place of the worm gears may also be used spiral gears. The shaft 6 is supported by a bearing 14 pivotally supported by the motor shaft 4 and by a guide 15 in the camera casing. A helical spring 16 keeps the worm 7 in constant engagement with the worm wheel 8 and is attached with one end to a slidable ring 17 mounted on the shaft 6. The other end of the spring 16 is attached to a pin 18 in the camera casing.

The bearing pin 9 with the worm gear 8 and the pinion 13 thereon is mounted on a radial projection 19a of an adjustment ring 19 which is arranged coaxially to the diaphragm adjusting ring 2. The axis of the pin 9 extends parallel to the optical axis of the objective C. The adjusting ring 19 has thereon another radially extending projection 20 which is pointer-shaped and has a laterally extending handle 21. Opposite the pointer-like projection 20 are positioned fixed marks 22 and 23 on the camera front wall $C_1$ which stand for different film speeds, e.g. expressed in 16 and 48 picture frames per second, respectively.

During an exposure the automatic exposure control device in conventional use adjusts by means of the diaphragm adjustment motor 1 the diaphragm aperture in accordance with the existing light conditions. If the projection 20 is moved from position 16 (dash-dot line in FIG. 1) to position 48, the worm wheel 8 on the pin 9 carried by the ring 19 is taken along in clockwise direction with the adjusting ring 19 and moves from the position indicated by a dash-dot line (FIG. 1) into the position indicated by solid lines. Thereby the worm gear 8 rolls along the stationary or rotating worm 7 and rotates the diaphragm adjusting ring 2 an amount which coresponds to the change of exposure time, so that after the change from "normal" to "slow motion" is completed, also the diaphragm aperture has been immediately adjusted to the correct value. Irrespective of this readjustment of the diaphragm aperture during the change of the film speed, the exposure control device remains working. The same, of course, is true for the change from 48 to 16 picture frames per second.

If the diaphragm is to be adjusted manually, for instance for the purpose of obtaining artistic effects, then the friction between the pinion 13 and the worm gear 8, which latter during the reverse flow of energy is locked by the worm 7, becomes effective. In order to prevent an unintentional adjustment of the worm gear 8 during the manual setting of the diaphragm, a locking of the speed selector in the positions associated with its different picture frame speeds is advisable.

Figure 3:
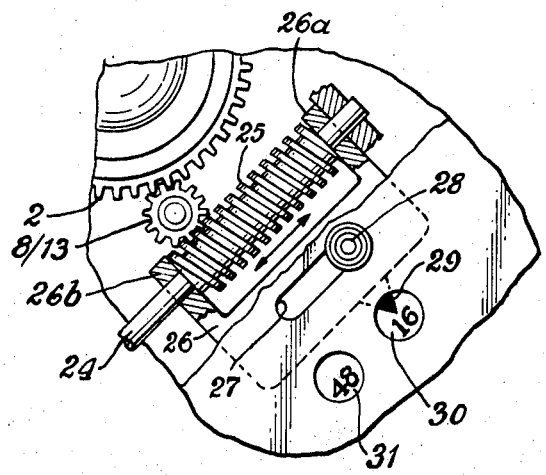
FIG. 3 illustrates a modified arrangement of the invention.

FIG. 3 illustrates an embodiment of the invention in which in place of the shaft 6 of FIG. 1 a shaft 24 is used on which a worm 25 is longitudinally displaceably arranged. The position of the worm 25 on the shaft 24 is changed and determined by a fork slide 26 whose two legs 26a and 26b engage the opposite ends of the worm 25. The slide 26 carries a handle 28 projecting outwardly through an opening 27 in the camera casing. This forked slide 26 has thereon a pointer tip 29 which selectively becomes visible in windows 30 and 31 in the camera casing, depending upon whether the slide is set for 16 or for 48 picture frames per second.

The diaphragm control is effected in the same manner as in the first embodiment of the invention, either by means of the automatic exposure control or manually. The selection of the film speed or picture frame per second, however, is now made by the forked slide 26. If the latter is adjusted from one film speed to another, it will take the worm 25 along in the same direction of movement. The worm 25 then drives like a gear rack the worm gear 8 and by means of the pinion 13 adjusts the diaphragm adjusting ring 2. Also in this case it is advisable, when the diaphragm is desired to be set by hand, to lock the forked slide 26 in its end positions associated with the respective film speeds by means of a ratchet or the like.

Figures 4, 5:
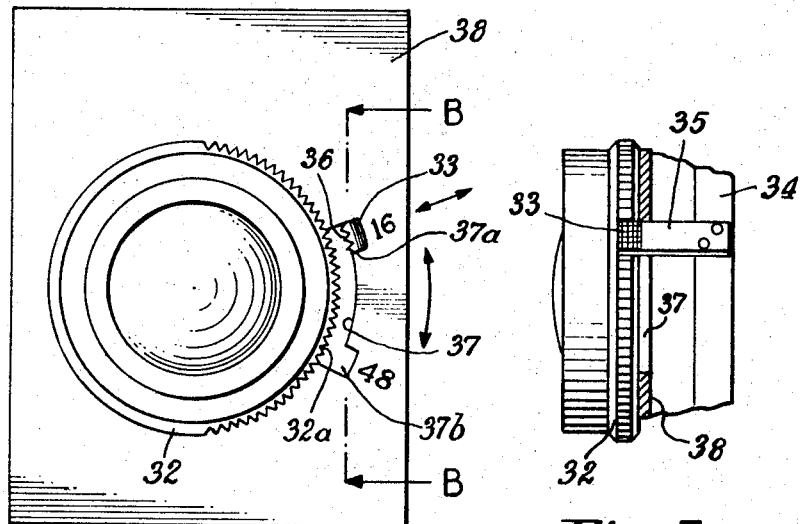
FIG. 4 illustrates in a view similar to FIG. 1 still another embodiment of the invention.
FIG. 5 is a view along the line B—B of FIG. 4.

The embodiment illustrated in FIGS. 4 and 5 assumes that a manual adjustment to overcome a frictional force is provided. The manual diaphragm adjusting ring 32 is associated with an operating member 33 of a film speed selector ring 34 arranged coaxially with respect to the camera objective. By means of a transverse resilient strap 35, which extends parallel to the optical axis of the objective, a resilient connection between the speed selector ring 34 and the operating member 33 is produced. The effect of the resilient strap 35 is so calculated that it keeps the manual operating member 33 away from the manual adjusting ring 32. The circumference of the manual adjusting ring 32 is provided with small teeth 32a which correspond to small teeth 36 provided on the operating member 33. An arc-shaped opening 37 in the camera wall 38 serves as a guide for the operating member 33. This guide opening 37 is provided at both ends of the adjustment range with outwardly extending recesses 37a and 37b serving as means for preventing an engagement of the members with the teeth 32a.

When during the operation of the camera the film speed is changed from one to another one, the operating member 33 is first moved from its rest position into operative connection with the teeth 32a of the manual adjusting ring 32. Thereupon the change to the other film speed is effected by moving the operating member 33 in peripheral direction of the ring 34 toward the other end of the opening 37, whereas the ring 32 is rotated until the other recess is reached. The then released operating member 33 under the influence of its resilient strap 35 releases the teeth 32a of the manual adjusting ring 32 and comes to rest in that new position. Thereby the film speed is changed as well as the required correction of the diaphragm aperture has taken place and the diaphragm is again ready for an automatic or manual adjustment.

What I claim is:

1. In a motion picture camera provided with exposure control means and a film speed selector operable during the operation of the camera:

(a) a photoelectrically controlled electric motor,
   (b) an adjustable diaphragm adjusting ring operated by said electric motor,
   (c) a speed reduction gearing arranged between said electric motor and said adjustable diaphragm adjusting ring, said speed reduction gearing including two interengaging toothed members of which one is bodily movable relatively and independently of the other, and (d) a film speed selector member and means operatively connecting said member with said bodily movable toothed member of said speed reduction gearing to effect an adjustment of said diaphragm adjusting ring independently of said electric motor to a position in which the diaphragm aperture corresponds to the selected film speed.

2. A motion picture camera according to claim 1, including in said speed reduction gearing a shaft driven by said electric motor, a worm axially slidably mounted on said shaft by rotating with the latter, a worm gear meshing with said worm and mounted on a shaft which is carried by said speed selector member, means on said last named shaft operatively connecting said worm gear with said diaphragm adjusting ring, and means for slidably adjusting said worm along its shaft and arresting said worm in two end positions, each of which corresponds to a different film speed.

3. In a motion picture camera provided with exposure control means and a film speed selector operable during the operation of the camera:
   (a) a photoelectrically controlled electric motor,
   (b) an adjustable diaphragm adjusting ring operated by said electric motor,
   (c) a speed reduction gearing arranged between said electric motor and said adjustable diaphragm adjusting ring, and
   (d) a film speed selector ring and means operatively connecting said ring with said speed reduction gearing to effect an adjustment of said diaphragm adjusting ring independently of said electric motor to a position in which the diaphragm aperture corresponds to the selected film speed, a bearing pin rotatably carried by said film speed selector ring, a worm wheel mounted on said bearing pin and forming a part of said reduction gearing, and a spur gear on said bearing pin and in mesh with gear teeth on the circumference of said diaphragm adjusting ring.

4. A motion picture camera according to claim 3, in which said spur gear is loosely mounted on said bearing pin, and friction clutch means operatively connecting said spur gear with said worm wheel.

5. A motion picture camera according to claim 3, including a resilient strap 35 on said film speed selector ring 34 which extends through a slot 37 in a camera wall and transversely over the circumference of said diaphragm adjusting ring 32 to engage the latter when the strap is manually depressed and to rotate said adjusting ring when subsequently said film speed selector ring is rotated.

6. A motion picture camera according to claim 3, including a resilient strap 35 on said film speed selector ring 34 which extends through a slot 37 in a camera wall and transversely over the circumference of said diaphragm adjusting ring 32 to engage the latter when the strap is manually depressed and to rotate said adjusting ring when subsequently said film speed selector ring is rotated, the circumference of said diaphragm adjusting ring in the region of said slot being provided with teeth adapted to be engaged by corresponding teeth provided on the portion of said resilient strap adapted to be brought into engagement with said diaphragm adjusting ring.

7. A motion picture camera according to claim 3, including a resilient strap 35 on said film speed selector ring 34 which extends through a slot 37 in a camera wall and transversely over the circumference of said diaphragm adjusting ring 32 to engage the latter when the strap is manually depressed and to rotate said adjusting ring when subsequently said film speed selector ring is rotated, said slot 37 being provided at both its ends with recesses 37a, 37b to receive and lock said resilient strap in positions indicating predetermined film speed settings.

8. A motion picture camera according to claim 3, in which the drive shaft of said electric motor carries rotatably thereon a bearing, a shaft extending transversely to said drive shaft and journaled in said bearing, a worm gear on said shaft and meshing with a worm on said drive shaft, said shaft having mounted thereon a worm forming a part of said reduction gearing which is operatively connected with said film speed selector ring and said diaphragm adjusting rings, and means mounting said film speed selector ring and said diaphragm adjusting ring in axially aligned relation around the optical axis of the objective of the camera.

9. A motion picture camera according to claim 8, including a worm wheel and a spur gear mounted in axial alignment with each other on a shaft carried by said film speed selector ring with said spur gear in engagement with gear teeth on said diaphragm adjusting ring, and means for keeping said worm on said last mentioned shaft in engagement with the worm wheel which is arranged in axial alignment with said spur gear.

10. A motion picture camera according to claim 8, including a worm wheel and a spur gear mounted in axial alignment with each other on a shaft carried by said film speed selector ring with said spur gear in engagement with gear teeth on said diaphragm adjusting ring, and spring means engaging the shaft carrying said worm wheel and said worm and urging said last mentioned shaft in a direction in which the worm on said last mentioned shaft is maintained in engagement with the worm wheel which is arranged in axial alignment with said spur gear.

References Cited

UNITED STATES PATENTS

| | | | |
|---|---|---|---|
| 2,059,032 | 10/1936 | Riszdorfer | 95—10 |
| 2,576,813 | 11/1951 | Simons | 95—10 |
| 2,983,205 | 5/1961 | Maitani | 95—64 XR |
| 2,996,965 | 8/1961 | La Rue et al. | 352—141 XR |
| 3,002,435 | 10/1961 | Briskin et al. | 95—10 |
| 3,128,669 | 4/1964 | Steisselinger | 352—141 |
| 3,261,653 | 7/1966 | Reinsch | 352—141 |

FOREIGN PATENTS 375,605   4/1964   Switzerland.

NORTON ANSHER, *Primary Examiner.*

J. F. PETERS, JR., *Assistant Examiner.*

U.S. Cl. X.R.

95—10; 352—180